A. J. FELSMAN.
CORN PLANTER.
APPLICATION FILED FEB. 18, 1915.
1,161,298.
Patented Nov. 23, 1915.
2 SHEETS—SHEET 1.
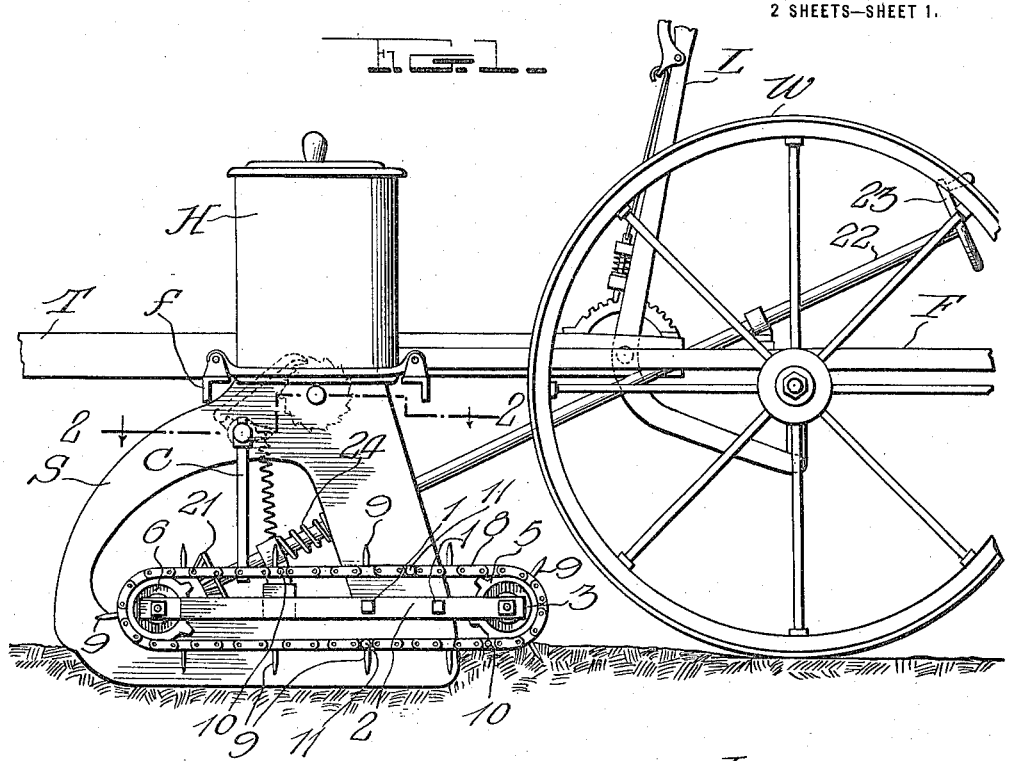
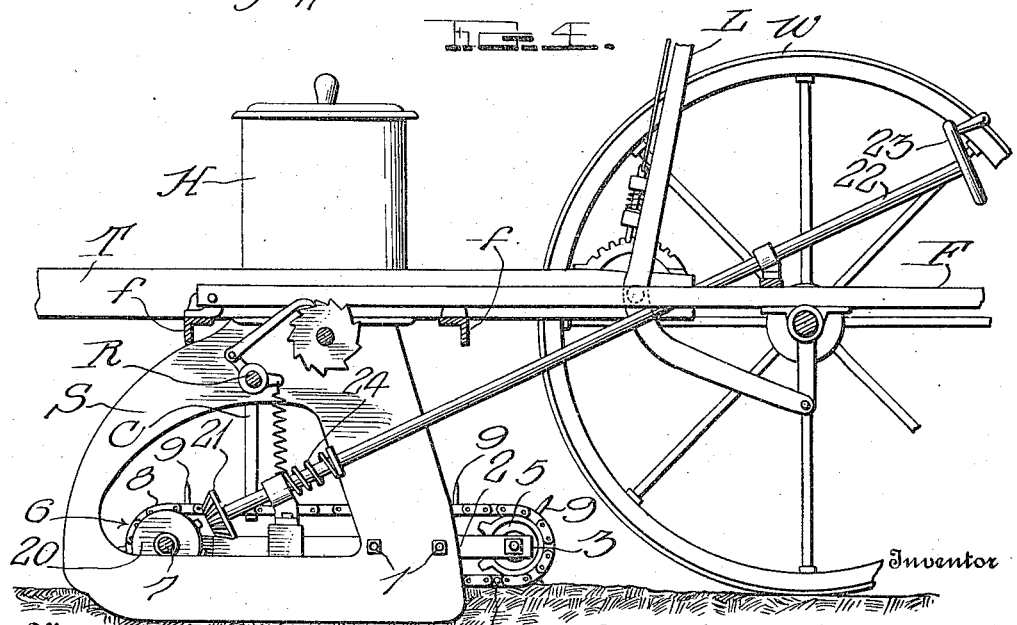
Witnesses
H. Woodard
Inventor
Albert J. Felsman
By H. B. Willson & Co.
Attorneys

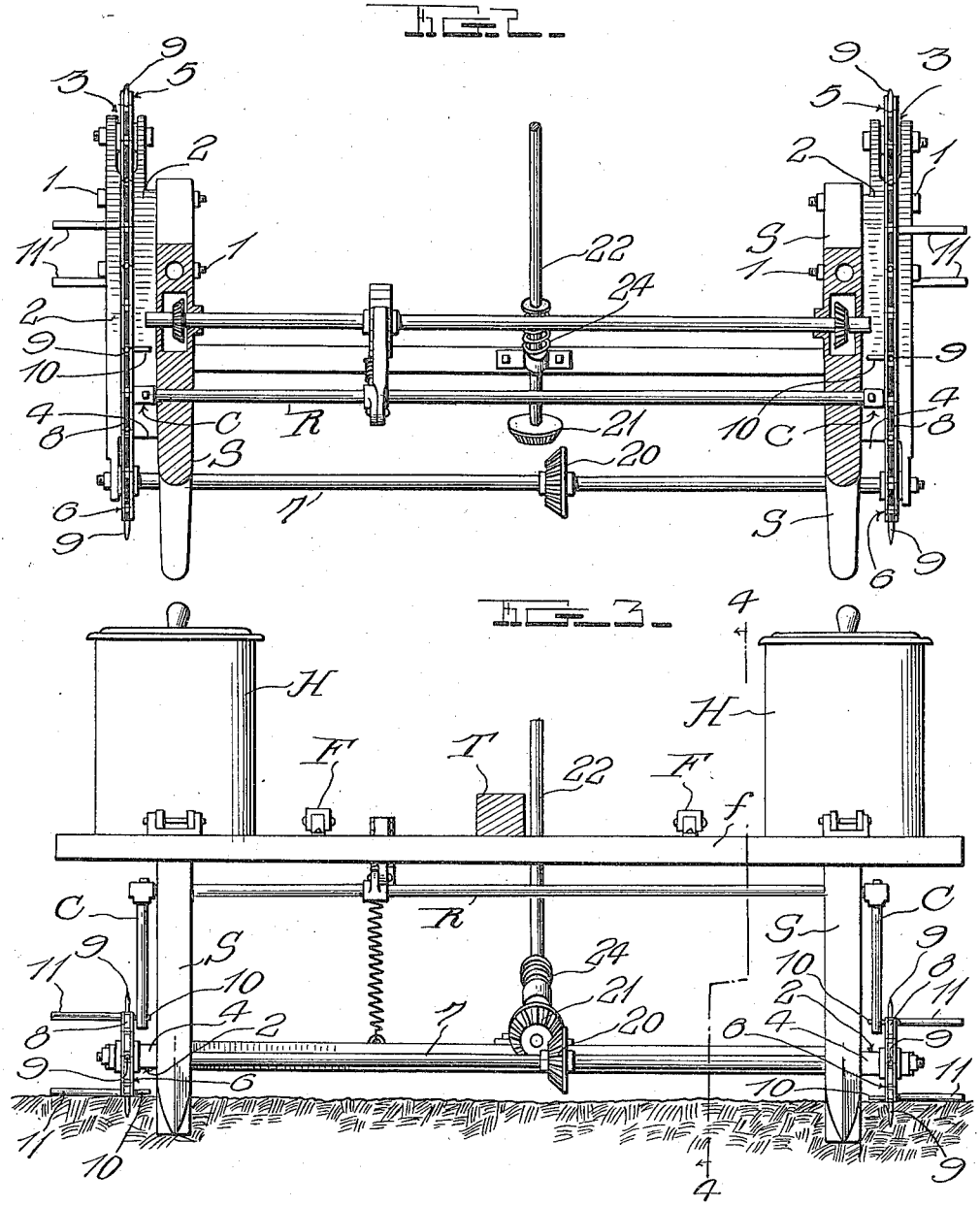

UNITED STATES PATENT OFFICE.

ALBERT J. FELSMAN, OF MACOMB, ILLINOIS.

CORN-PLANTER.

1,161,298.  Specification of Letters Patent.  Patented Nov. 23, 1915.

Application filed February 18, 1915. Serial No. 9,103.

*To all whom it may concern:*

Be it known that I, ALBERT J. FELSMAN, a citizen of the United States, residing at Macomb, in the county of McDonough and State of Illinois, have invented certain new and useful Improvements in Corn-Planters; and I do declare the following to be a full, clear, and exact description of the invention, such as will enable others skilled in the art to which it appertains to make and use the same.

My invention relates to improvements in corn planters and has for its main object to improve upon the construction of devices of this character to such an extent as to eliminate the use of the usual check wire now employed on most types of planters.

To the above end, a further object is to equip the machine with means whereby certain adjustment may be made should it be found that the rows of grain are not being planted in alinement.

With these general objects in view, the invention resides in certain novel features of construction and combination hereinafter more fully described and claimed and shown in the drawings wherein:

Figure 1 is a side elevation of a corn planter constructed in accordance with the invention; Fig. 2 is a horizontal section as seen along the plane indicated by the line 2—2 of Fig. 1; Fig. 3 is an end view; and Fig. 4 is a central vertical longitudinal section as seen along the plane indicated by the line 4—4 of Fig. 3, this view showing a normally idle gear, to be described, disposed to active position.

In these drawings, constituting a part of the application, a corn planter is shown comprising the usual main frame F which is supported by the usual wheels W and whose forward end is hingedly connected to the transverse hopper frame $f$. To the latter, an appropriate form of tongue T, a pair of hoppers H and a pair of seed shoes S are connected in any well known manner forming no part of the present invention. It is essential, however, that the hoppers be disposed to discharge seed into the shoes S and that a transverse rock shaft R, or the equivalent thereof, be provided for intermittently actuating the seed controlling mechanism. In the present case, the two ends of the shaft R are shown as having depending cranks C, these cranks being adapted for a purpose to be hereinafter described.

In addition to the parts so far briefly mentioned, the planter is provided with an upright lever L which, when rocked in the proper direction, will raise the hopper frame, while disposition of said lever to an opposite position will lower said frame as is well known to those skilled in the art to which the invention relates. Although such a lever L is preferably provided, it is to be understood that any appropriate means for raising and lowering the hopper frame could well be provided, and that if necessary, such means could probably be dispensed with.

Secured by bolts 1 or other appropriate fasteners to the outer sides of the two shoes S, is a pair of longitudinally extending horizontal bars 2, the rear ends of which are forked as seen at 3, while their forward ends are notched on their inner sides as indicated at 4 (see more particularly Fig. 2). Disposed within the forked rear ends of the bars 2, is a pair of rear guide sprockets 5, while a pair of similar sprockets 6 is revolubly mounted in the notches 4, the two sprockets 6 being, in the present case, keyed to a transverse shaft 7 which overlies the two shoes as clearly shown in the longitudinal section.

Passing around the front and rear sprockets 5 and 6, is a pair of flexible endless operating members 8, these members being here shown in the form of sprocket chains having a plurality of earth engaging projections 9, these projections being adapted to prevent slipping of the lower stretches of the chains, as the same travel upon the ground when the planter is propelled thereover.

By reference to the various figures of the drawing, it will be seen that the upper stretches of the operating members 8 are spaced laterally to a slight extent from the cranks C and that each of these members is provided with a pair of inwardly projecting trips or tappets 10 which are spaced equidistantly on said members. It therefore follows that as the planter is drawn forwardly the two trips 10 on the two chains, will intermittently rock the shaft R, thus intermittently discharging seed into the shoes S. In connection with the mechanism so far described, however, I preferably provide a pair of combined land marking and indicating fingers 11 on each member 8, these fingers being so disposed upon said members as to cause one of said fingers on each member 8 to mark the land at exactly the points at which hills of seed are planted, as the planter is propelled over the field. This is advantageous, since on the return trip, when the fingers 11 are adapted to aline with the marks previously made, it will be evident that the hills of seed planted on such return trip, will be alined with those planted on the previous trip. In case it is found that the fingers 11 do not aline with the marks previously made, however, and in order to properly aline said fingers with said marks at the beginning of each row, it becomes expedient to provide means whereby the two endless members 8 may be moved over the ground, irrespectively of the movements of the planter. For this purpose, I have keyed a bevel gear 20 on the transverse shaft 7 and have provided an additional bevel gear 21 to be thrown into mesh with said gear 20, the gear 21 being keyed upon a longitudinally extending shaft 22 which is revolubly mounted in appropriate bearings and whose rear end is provided with a hand wheel 23 located adjacent the driver's seat. The shaft 22 is normally moved rearwardly to a certain extent by a coil spring 24, to disengage the gear 21 from the gear 20, thus allowing the latter and the transverse shaft 7 upon which it is keyed to rotate without imparting rotary movement to the shaft 22. When, however, it is necessary to move the members 8 over the ground, independently of the movements of the planter, the shaft 22 is forced forwardly to engage its gear 21 with the gear 20, whereupon the last-named gear, the shaft 7 and the members 8, may be either locked against movement in one direction, or may be rotated in the other direction, for the purpose of alining the fingers 11 with the previously made marks. It will therefore be seen, that the various rows of seed may be checked in parallel rows extending both ways across the field.

From the foregoing description, taken in connection with the accompanying drawings, it will be seen that comparatively simple construction has been provided for carrying out the objects of the invention, yet that a machine constructed in accordance with the drawings and description, will possess a number of advantageous features. Among these features, is the fact that the positions of the indicating fingers 11 in respect to the previously made marks, can be ascertained a considerable length of time before the seed is to be dropped, thus allowing ample time for making any adjustments of the members 8 which may be necessary. Another advantageous feature of the device, is the fact that the various parts thereof may be applied to practically any common type of corn planter without the necessity of altering the same to any appreciable degree.

I claim:

1. The combination with a planter having mechanism for controlling the discharge of seed therefrom, and an endless flexible operating member for actuating said mechanism to discharge the seed intermittently, the lower stretch of said member being adapted to travel on the ground when the planter is propelled thereover; of an indicator carried by said endless operating member, and means under the control of the operator for sliding the aforesaid lower stretch of said member forwardly and rearwardly over the ground independently of the movement of the planter, whereby to control the actuation of the seed discharge mechanism until the indicator is disposed at a predetermined point.

2. The combination with a planter having mechanism for controlling the discharge of seed therefrom, and an endless flexible operating member for actuating said mechanism to discharge the seed intermittently, the lower stretch of said member being adapted to travel on the ground as the planter is propelled thereover; of a wheel around which the flexible operating member passes, and means under the control of the operator for rotating said wheel in either direction, whereby the aforesaid member may be moved forwardly and rearwardly over the ground independently of the movement of the planter, and an indicator carried by said member.

3. The combination with a planter having mechanism for controlling the discharge of seed therefrom, and an endless flexible operating member for actuating said mechanism to discharge the seed intermittently, the lower stretch of said member being adapted to travel on the ground as the planter is propelled thereover; of a wheel around which the flexible operating member passes, a gear rotatable with said wheel, an additional gear disposed adjacent the aforesaid gear but normally out of mesh therewith, and a longitudinally shiftable and rotatable shaft carrying said additional gear, whereby the same may be thrown into mesh with the first named gear and rotated to adjust the operating member, and an indicator carried by said member.

In testimony whereof I have hereunto set my hand in presence of two subscribing witnesses.

ALBERT J. FELSMAN.

Witnesses:
 CHARLES W. FLACK,
 FRANK L. LEFTRIDGE.